United States Patent [19]
Knotts

[11] Patent Number: 5,704,248
[45] Date of Patent: Jan. 6, 1998

[54] BEARING TOOTH GEAR

[76] Inventor: Stephen E. Knotts, 417 173rd Pl. NE., Bellevue, Wash. 98008

[21] Appl. No.: 374,929

[22] Filed: Jan. 18, 1995

Related U.S. Application Data

[63] Continuation-in-part of Ser. No. 75,147, Jun. 10, 1993, Pat. No. 5,381,704.

[51] Int. Cl.$^6$ .................... F16H 1/12; F16H 55/22
[52] U.S. Cl. ........................ 74/416; 74/443; 74/465; 248/562
[58] Field of Search ................. 74/443, 415, 465; 248/562

[56] References Cited

U.S. PATENT DOCUMENTS

| | | | |
|---|---|---|---|
| 277,802 | 5/1883 | Stanley et al. | |
| 596,884 | 1/1898 | Jamieson | 74/416 |
| 613,148 | 10/1898 | Jamieson | 74/416 |
| 620,074 | 2/1899 | Jamieson | 74/416 |
| 1,246,045 | 11/1917 | Boker | 74/465 |
| 3,385,127 | 5/1968 | Naruse et al. | 74/443 |
| 3,720,115 | 3/1973 | Vertin | 74/465 X |
| 3,766,788 | 10/1973 | Metz | 74/465 X |
| 4,274,296 | 6/1981 | Miller et al. | 74/459 X |
| 4,541,297 | 9/1985 | Fujita | 74/465 |
| 4,685,346 | 8/1987 | Brackett | 74/465 X |
| 4,998,442 | 3/1991 | Brown et al. | 74/465 X |

*Primary Examiner*—Allan D. Herrmann

[57] ABSTRACT

Elaboration on the merits of an improved gear family known as Bearing Tooth Gears. The rotative contact of meshing Bearing Teeth in a Bearing Tooth Gear set, allows for an increase in candidate materials, used in the construction of these gears and allows for improved structural designs of the Bearing Tooth assemblies and gear housings. In addition, prefer positioning of support bearings is also conveyed.

16 Claims, 7 Drawing Sheets

BEARING TOOTH GEAR

REFERENCES TO RELATED APPLICATIONS

This application is a continuation in part for the application with Ser. No. 08/075,147, which was filed on Jun. 10, 1993 now U.S. Pat. No. 5,381,704. The earlier filing date of this application is hereby claimed.

BACKGROUND OF THE INVENTION

1. Field of the Invention

This invention relates to the Bearing Tooth Gear and related gear types, with rotatable gear teeth and in particular the attachment methods, bearing placement, constructive materials and specific design types and configurations of said tooth structures.

2. Description of Prior Art

The design and manufacture of conventional gears, is an old and a somewhat antiquated technology or more accurately, an art. The world's gear manufactures still use the same designs, construction methods and materials, that have changed little for the past century, in particular, cantilever tooth structures, which can be of a complex nature or geometry, such as, the Spiral Bevel, Helical, Crossed Helical, Hypoid, Spiroid, Helicon are machined into metallic alloys and then hardened by various heat treating processes. These teeth are designed to be in sliding contact, with a thin lubricant film separating the mating teeth.

There are numerous advantages to be had by replacing the sliding contact, of the conventional gear, with the rolling contact, of the Bearing Tooth Gear. The obvious energy savings due to the difference in sliding versus rolling friction, is just the start. Some of the improvements of the Bearing Tooth Gear, follow. Field servicing is now an option, servicing is less costly, increases the number of candidate manufacturing materials, lighter weight structures can be made, increases the number of manufacturing processes that can be utilized, tighter tolerances easier to maintain on tooth geometry and tooth placement, stocking of standard tooth types is cost effective, decreases overall cost in manufacturing, quicker build and delivery times of replacement parts, enlarges operating envelope, reduces operating noise, reduces lubricant fluid drag, greater tolerance to shock loads, more tolerant of foreign object contamination, smaller and more highly loaded gear sets can be made.

Rotatable gear teeth have been presented in past patents, such as, Stanley (U.S. Pat. No. 277,802; issued May 15, 1883): Saladee (U.S. Pat. No. 486,055; issued Nov. 8, 1892): Jamieson (U.S. Pat. No. 596,884; issued Jan. 4, 1898): Jamieson (U.S. Pat. No. 613,148; issued Oct. 25, 1898): Jamieson (U.S. Pat. No. 620,074; issued Feb. 21, 1899): McCormick (U.S. Pat. No. 633,470; issued Sep. 19, 1899): Froelich (U.S. Pat. No. 1,159,486; issued Nov., 9, 1915): Wojtowicz (U.S. Pat. No. 2,792,715; issued May 21, 1957): Gilbert (U.S. Pat. No. 3,608,392; issued Jun. 15, 1970): Grayson (U.S. Pat. No. 3,845,670; issued Nov. 5, 1974): Knutson (U.S. Pat. No. 4,093,036; issued Jun. 6, 1978): Fujita (U.S. Pat. No. 4,541,297; issued Sep. 17, 1985): and Kerkhoff (U.S. Pat. No. 4,879,920; issued Nov. 14, 1989).

While some of the above mentioned patents touch on attributes such as the ability to replace worn parts (U.S. Pat. Nos. 277,802; 596,884; 1,159,486; 2,792,715) diminishing friction and wear (U.S. Pat. Nos. 486,055; 596,884; 613,148; 633,470; 4,879,920) silent operation (U.S. Pat. Nos. 1,159,486; 3,608,392) backlash elimination (U.S. Pat. Nos. 3,608,392; 4,879,920), none of these patents explore the fully potential of the technology nor the means to obtain that potential.

Items such as, the option to exercise tight, yet more cost effective, tolerance control during manufacture yet being more adaptive to manufacturing inaccuracies, or the fact that fewer and larger, more load capable, gear teeth can be employed. Or the option of being able to have quick release Bearing Tooth packs or assemblies, which allow teeth to be replaced with greater ease. Or the option of employing displacement and shock tolerant materials and structures such as elastomeric and/or plastics and/or fluid filled and/or gas filled teeth and/or similar materials and/or structures for the zone that receives the bearing packs, within the support housings and the option of using cheaper and/or light weight load bearing materials for these structures, all lead to the following attributes; gear sets that are tolerant of higher shock loads, much quieter gear sets due to greater sound adsorption and vibrational dampening capabilities, elimination of high stress point loading, less massive structures for weight critical applications (eg. aerospace systems), greater capability to tolerate adverse operating environments, such as high dirt, high grit, high moisture and even corrosive environments. And finally, by not limiting the support bearings to the interior of the rotatable tooth, gives the option of constructing a Bearing Tooth, which possesses greater structural continuity and greater beam cross-section, thereby giving greater bending and torsional load capacity.

SUMMARY OF THE INVENTION

To elaborate upon the previously mentioned objects, all of the benefits or attributes of this invention are a result of the following change of mind set, that being, the substitution of rolling contact for sliding contact, the latter of which, is present in all conventional gear sets. The rolling contact of the Bearing Tooth Gear allows a number of capabilities to be added to its list of attributes. Capabilities which at best, are difficult to achieve if not impossible with conventional gear sets, where sliding contact is the method of tooth engagement.

The rolling contact of the Bearing Tooth gear will improve the energy efficiency of a machine's gear train because of several factors. The obvious fact that rolling friction is less than sliding friction, even if the sliding surfaces are lubricated, can be verified, by checking just about any lubrication handbook but there are other ways that conventional gear efficiency is affected. One lose factor that is often ignored is the drag produced by the fluid lubricant, which is required for the conventional gear set. It is often thought that this drag effect is of little consequence even when employing heavy weight or high viscosity lubricants. Normally this is the case but have a machine operate in a low temperature environment and the viscous drag effect, can become substantial. Consider the example of a cold winter day in the Midwest, where perhaps the temperature drops to −10 degrees Fahrenheit. It is not difficult to envision what happens to the oil, in the differential of ones car, it turns to a virtual glue and this thicken lubricant will substantial impede the rotation of the gear set. Now consider the fact that perhaps 30 million commuters are in this low temperature region and are experiencing this lubricant drag effect, the cumulative energy loses would be huge and this scenario happens more than once a year. The Bearing Tooth Gear differs, in that, a Bearing Tooth Gear set, need not be immersed in a lubricant because of the rolling action and materials and structures that the Bearing Tooth can employ. The only location where lubrication is required for a Bearing Tooth assembly is within the support bearings of the individual tooth and when one considers quantity of lubricant and size of the structures, the fluid drag would truly be of little consequence.

While some conventional gear designers have attempted to employ some measure of field servicing, by having removable tooth tracks of perhaps 8 to 10 gear teeth, there are problems with obtaining adequate tolerances with this method. If a facility undertakes the machining of a 10 tooth gear track, with its complex geometry, it soon finds the difficult in holding tight tolerance control on such a intricate and complex part. This problem expands, when for example, 8 of these tracks must be mated with a support housing. Now a reasonable degree of tolerance control must be exercised with the positional locating and with the three axis orientation, of these parts, relative to the gear housing. To have a conventional gear set with high speed capability and high transmission efficiency, requires tight tolerance control. A general manufacturing rule is, the tighter the tolerance control, the higher the price of manufacture.

In contrast, the Bearing Tooth Gear has a simpler geometry, with cylindrical and cylindrical like (eg. bell shaped), cross sections which allow the very high tolerance control of a turned part. Also, the accurate locating of the individual Bearing Tooth, in the support housing, is an easier task for several reasons. One of the more obvious reasons is, the three axis angular alignment requirement, of the conventional gear tooth, is reduced to, two axis, with the Bearing Tooth Gear. There is no clocking tolerance or control requirement for the third axis, or the axis of rotation, for the individual Bearing Tooth. Since the third axis is the axis a Bearing Tooth spins on and is not a set feature, as with a conventional gear, there is no need to exercise tolerance control on this parameter. Also, the relatively simplistic structure of a receptacle hole, for an individual Bearing Tooth assemble, is a feature where high tolerances are much easier to obtain versus the machining of a conventional gear tooth, with its complex geometry and its stringent placement and orientation requirements. Lastly, even though a more accurate structure can be obtained with the Bearing Tooth Gear, it does not require the same stringent tolerance control of the conventional gear. Because of the options available to the Bearing Tooth Gear, such as the use of displacement tolerant materials (e.g. elastomers), the Bearing Tooth Gear can accommodate greater manufacturing inaccuracies.

Another point to consider is that most of the conventional gear's failure modes are inapplicable to the Bearing Gear (eg. pitting, scoring) and some are greatly reduced (eg. wear). Thus these failure types which for the conventional gear, are driven by large tooth size, do not limit the tooth size of the Bearing Gear. This gives the option of employing larger gear teeth with higher individual tooth load capacity, which in turn allows the use of smaller more compact gear housings which are capable of transmitting the same torque loads as a conventional gear with its large diameter and low tooth loads (eg. Torque=Tooth Load×Housing Radius). Not only can the tooth structure be larger for the Bearing Tooth Gear but fewer teeth are required to cover a given circumference, thus there are fewer structures to manufacture and therefore fewer structures to exercise tolerance control on.

All of these features reduce cost and add to the practicality of having replaceable gear teeth which in turn greatly reduces any future repair costs. With some of these roadblocks and obstructions removed from the premise of replaceable gear teeth, further refinements can still be made, in the methods with which these Bearing Teeth are attached, to the main gear housing.

To simplify the repair and replacement of damage or worn Bearing Teeth, complete Bearing Tooth packs or assemblies could be made, which contain a load and environment capable bearing set, of the designers choice. This could include one or a combination of the following bearing types; ball bearings single or multi-row, angular-contact ball bearings, ball bushings, roller bearings, cylindrical roller bearings, needle bearings, tapered roller bearings, spherical roller bearings, fluid film bearings, journal bearings and finally thrust bearings of the ball, straight-roller or tapered-roller type, could be used in conjunction with any of the above radial load type bearings. The proper bearing type or types could be selected to accommodate all projected operating speeds and all projected axial, bending, shear and torsional loads. These tooth packs would have seals to contain all internal lubricants and assure complete environmental insolation. These packs could then have a myriad of attachment methods to the gear housing, external threading, tapered slip joint, straight slip joint, pin or bolt restraints, side slip joint, side access ports.

With these totally self contained Bearing Tooth assemblies not only would the act of repair and servicing be greatly simplified but the individual part cost will decrease due to the mass production aspect, of families of varying Bearing Tooth types. This mass production aspect can apply to smaller conventional gears, where perhaps 1,000 one inch in diameter spur gears are manufactured but this option soon becomes less practical as the gear size increases and the number of applications decrease. For instance, if a manufacture has an order for 3 ten foot in diameter conventional gear types, that manufacture will not build any spares because it maybe ten years before another gear of this type is purchased, if ever. If the same order was place for 3 Bearing Tooth Gears, with 30 teeth per gear, it could be cost effective to build 100 or 150 teeth, where the spares could be utilized for future orders of different gear types, that could utilized this standard tooth type (eg. perhaps a 5 foot in diameter gear could use the Bearing Teeth from this tooth family).

The rolling contact aspect, of the Bearing Tooth Gear, again comes into play with this next manufacturing option and that is, an increase in the list of candidate materials and in the design choices for the tooth and housing types, that the designer can now employ. The conventional gear designers are limited in types of materials and processes they can utilize, because of the contact zone environment, with its high contact and shear loading and the high bending stresses experienced by these relatively, small highly loaded cantilever beams. These operating characteristics of the conventional gear, will cause all but a few materials to fail. So except for the occasional Nylon or Brass gears with their low load and operational speed limits, the material of choice is a harden steel alloy. The steel alloys used in the construction of most gear types are heavy, brittle, difficult to machine and both costly as a material and costly to process.

A comparison to systems that use rolling structures of varying materials and configurations, could prove useful here. So as an example the automobile, with its elastomeric, pneumatically filled structures that interface with the road surface (eg. tires), which among other functions, contributes to the shock dispersion or diffusion capability of the suspension system, an elastomeric, pneumatically filled Bearing Tooth could provide the same capability to a gear set. Again, the design of an individual Bearing Tooth can be much like an automobile tire, where there are various design choices available for the tread and the ply designs (eg. radial), which among other functions, control wear patterns and modulating or decreasing the operational noise signature of a gear set. Like the tire designer, the gear designer can choose various rubber compounds that offer varying rolling friction (eg. traction) and wear performance. Bearing Teeth could be designed to handle high loads with minimal deflection or displacement at the contact point. By following the tire model once again, the technology of the solid rubber tire of the industrial forklift or the high pressure tire of the Navy's, carrier based, aircraft, could be employed in the design of Bearing Teeth that require high load, minimal displacement, operating characteristics. And some applications may require the high pressure pneumatic performance but a high pressure hydraulically filled Bearing Tooth could provide similar performance, yet offer a more benign failure behavior. Finally, each Bearing Tooth would have a support structure that interfaces with the shock load tolerant materials, such as the above mention elastomers, pneumatic or hydraulic filled structures. This support structure or mounting shaft could be made of the steel alloys currently employed in the construction of conventional gear types. Although, this mounting shaft could be constructed from a myriad of materials, such as, light weight aluminum alloys, plastics and even carbon composite to name a few.

All of the material and structural design choices for the individual Bearing Tooth could also be applied to the receiving pocket or support structure that receives the Bearing Tooth assembly pack. So for instance, a pneumatic tooth design could be mated with a solid rubber support ring within the gear housing, giving additional sound deadening and shock insolation performance. Or a solid steel Bearing Tooth, could have an pneumatic support ring in the gear housing/support structure. Also, the support structure design lends itself to the utilization of light weight materials, like those mentioned above. In addition many other low cost manufacturing methods can now be employed in the fabrication of the main support structure, such as, the injection molding, fabrication method, for plastic parts.

The final design point should be considered to obtain the full potential from the Bearing Tooth concept and that is, not to limit the support bearings to the interior of the individual Bearing Tooth or more precisely, the bearings should not be placed in the more restrictive envelope of the Bearing Tooth contact zone. The tooth geometry of the contact zone, is controlled by several factors, such as, the number of Bearing Teeth on the gear and pinion and the mounting radii, for the respective teeth, of the gear and pinion. Instead, the support bearings should be placed in the main gear housing or support structure and outside of the Bearing Tooth contact zone, by doing this the following advantages are allowed. Larger bearings can be utilized if they are mounted in the gear housing, outside of the more restrictive envelope, of the contact zone and these larger bearings can tolerate higher loads. Not having the need to include the support shaft, bearing sets and Bearing Tooth shell, within the same envelope, allows greater easy of accommodating the previously mentioned materials (eg. elastomers) and structure types (eg. pneumatic teeth). Lastly, if the support bearings are in the main gear housing, the Bearing Tooth itself, could be one complete, solid and uninterrupted shaft or structure. It is obvious that a solid 4 inch in diameter steel shaft with its mating bearing set within the main gear housing, will have a much greater load capacity than a Bearing Tooth, that must share this 4 inch in diameter envelope between a support shaft, bearing set and tooth shell.

DETAILED DESCRIPTION OF THE INVENTION

Figure 1:
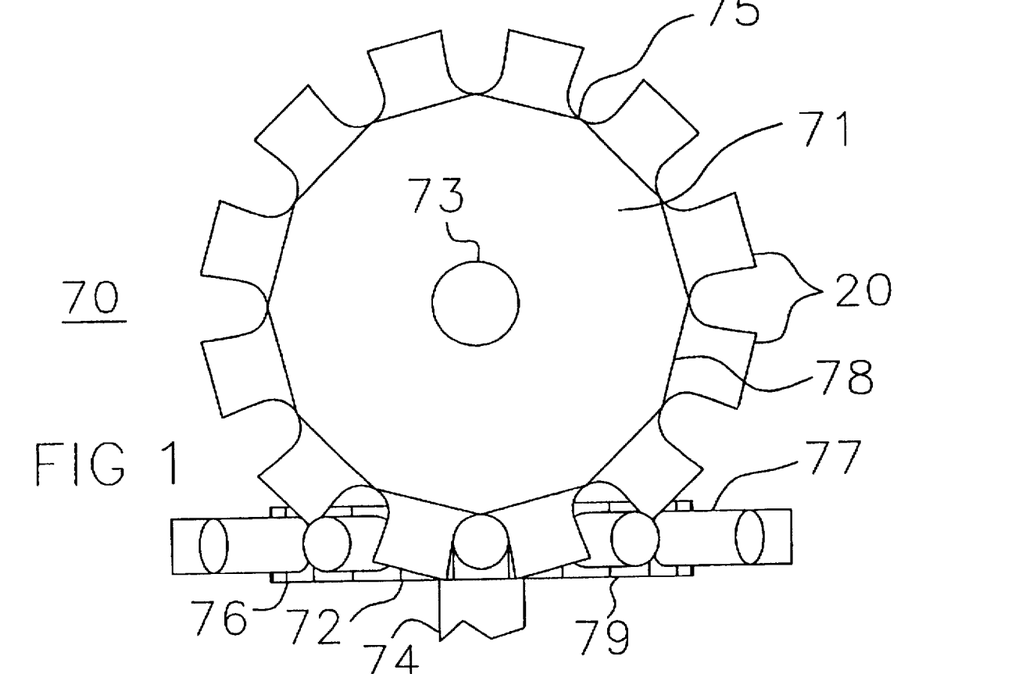
FIG. 1 is a top view of a spoke type Bearing Tooth Gear set, with a 1 to 1 gear ratio.
Figure 2:
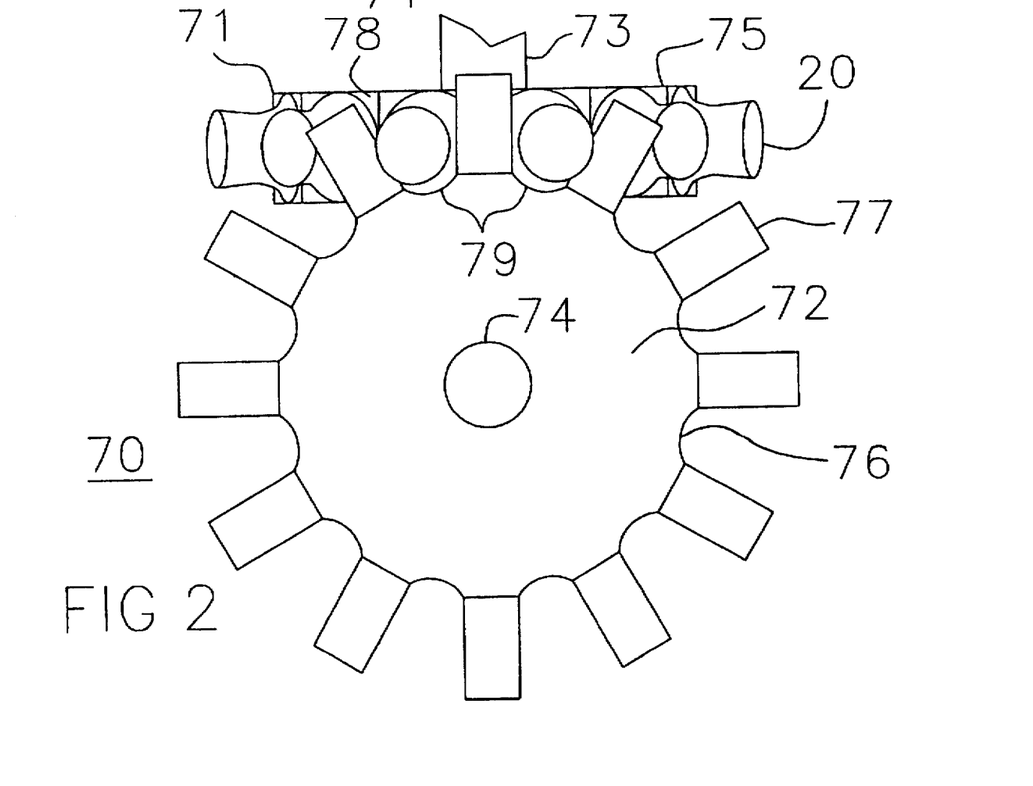
FIG. 2 is a side view of the same spoke type Bearing Tooth Gear set shown in FIG. 1.

Several configurations that embody Bearing Tooth technology will be discussed in conjunction with a particular sketch but this does not necessarily limit those attributes to that configuration alone. Refer now to FIG. 1 & 2 which shows one of the preferred embodiments of the invention. The inventor has labeled assembly 70, as a spoke type, Bearing Tooth Gear set. Gear set 70 has a 1 to 1 gear ratio and is comprised of gear assembly 75 and pinion assembly 76. One of the more unique features of gear set 70 is the rotatable gear teeth 20 and 77, whose structural size can be larger than a conventional gear tooth and therefore are capable of handling higher loads, in addition tooth assemblies 20 and 77 can be quickly removed for servicing. Each of these tooth assemblies can be attached by a myriad methods to their respective support housings 71 and 72 and these gear housing are then supported by their respective torque transmission shafts 73 and 74 which can in turn, transmit rotative work to some other point. The geometry of support housings 71 and 72 are controlled by a number of factors such as the required design radii of these housings and the number and type of Bearing Teeth that these housings must receive. For example, the radial periphery of each gear housing must be designed so that this feature does not interfere with the mounting of its respective Bearing Tooth, such as the machine flat of feature 78, nor should a housing's radial periphery interfere with the meshing of teeth, from the mating gear. So some material could be removed to avoid this interference as in feature 79.

Figure 3:
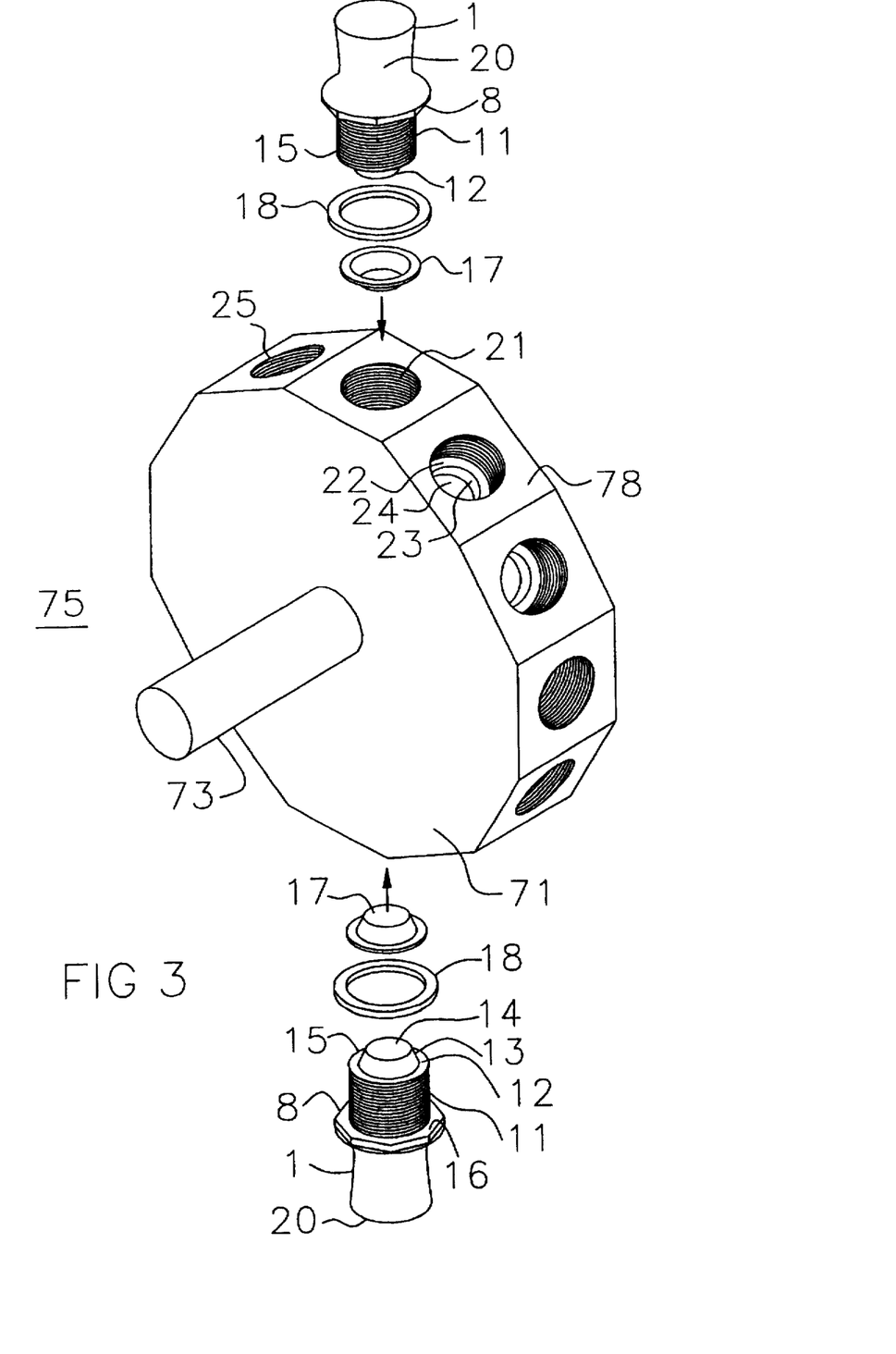
FIG. 3 is an exploded isometric view of a spoke type Bearing Tooth Gear with two Bearing Teeth and receiving pockets shown.

FIG. 3 shows item 75 which is an exploded view of one of the gear assemblies of gear set 70 shown in FIGS. 1 & 2. In this sketch, a more detailed view of Bearing Tooth assembly 20, gear housing 71 and a preferred attachment method, are shown. The attachment method shown utilizes screw type treads 11 on both the bearing housing 15 and a mating tread type 21 on the receiving pocket or socket 25 within the gear housing 71. Assume the Bearing Tooth contact structure 1 within the meshing or contact zone becomes damaged or worn, it would be a simple matter of mating a crescent wrench to the octagonal bolt head 8 or similar bolt head type and unscrew the Bearing Tooth assembly 20 from its receiving pocket 25. A new or reworked Bearing Tooth assembly could then be screwed into the receiving pocket 25 on the gear housing. If during the installation of Bearing Tooth assembly 20, some addition degree of depth control is required, shims 17 or 18 of varying thicknesses could be set between their corresponding mating surfaces between the Bearing Tooth assembly 20 and the gear housing 71, these follow. In the particular configuration shown, there are four potential shimable surfaces, shim 17 is designed to separate the three surfaces 22, 23, 24 of the housing 71 from their corresponding structures 12, 13, 14 on the bearing housing 15. Although, it should be recognized that shim 17 could be design to provide a separation space between any one set of surfaces (eg. 14 & 24). Shim 18 is much the same as a washer except for the ridge control of part thickness, shim 18 could also offer control, on the precise installation of the Bearing Tooth assembly 20, by providing separation between surfaces 16 and 78.

As can be seen in FIG. 3, the replacement of a damage gear tooth could be quite a simple and inexpensive process for a number of reasons. Consider the following, if an individual Bearing Tooth assembly 20 becomes damaged, it can be quickly replaced without removing the gear housing 71 from its torque transmission shaft 73. The repair of a large conventional gear is quite a different story. If a tooth is damaged or broken on a conventional gear, the whole gear must be removed from its transmission, which can be a very difficult task, as an example to remove a damaged 10 ft diameter gear from a large ship, one literally needs to cut a hole in the side of the hull. The whole gear must then be transported back to a gear manufacture for repair which could take weeks, this obviously is a very timely and costly process. The repair of a damage Bearing Tooth Gear would not suffer from the same lengthy repair times and high repair cost for the following reasons.

Part of the quick replacement time is not just the installation but the fact that a manufacture is much more likely to stock a relatively small, standard and possibly reworked or reconditioned Bearing Tooth assembly 20 because that Bearing Tooth assembly 20 would have a relatively low part cost and relatively high sales volume. So with a Bearing Tooth Gear set, it is much more likely that the parts used in its construction, will have the attribute of being "off the shelf", in fact, many of the parts that go into the construction of Bearing Tooth assembly 20 can be designed to utilize "off the shelf" supplier parts (eg. bearings, seals). With assembly 20 having the quality of being an "off the shelf" or a stock part, it is a simple matter to supply even the most distant customer with replacement parts in a very short period of time. With the world's current overnight express delivery services, a damaged Bearing Tooth Gear could be repaired within 24 hours or less, virtually world wide. So the damaged Bearing Tooth Gear would have shorter down times and therefore, the associated down time costs would be less. Also, the labor costs are less, when quickly replacing a damaged Bearing Tooth assembly 20 versus the time to dissemble a transmission to remove a conventional gear and the cost of parts for the standard Bearing Tooth assembly 20, will be much less than the cost of repairing a broken conventional gear tooth (eg. weld tooth on, re-machine fracture zone, heat treat gear, refinish tooth surface) or replacing the whole conventional gear.

Figure 4:
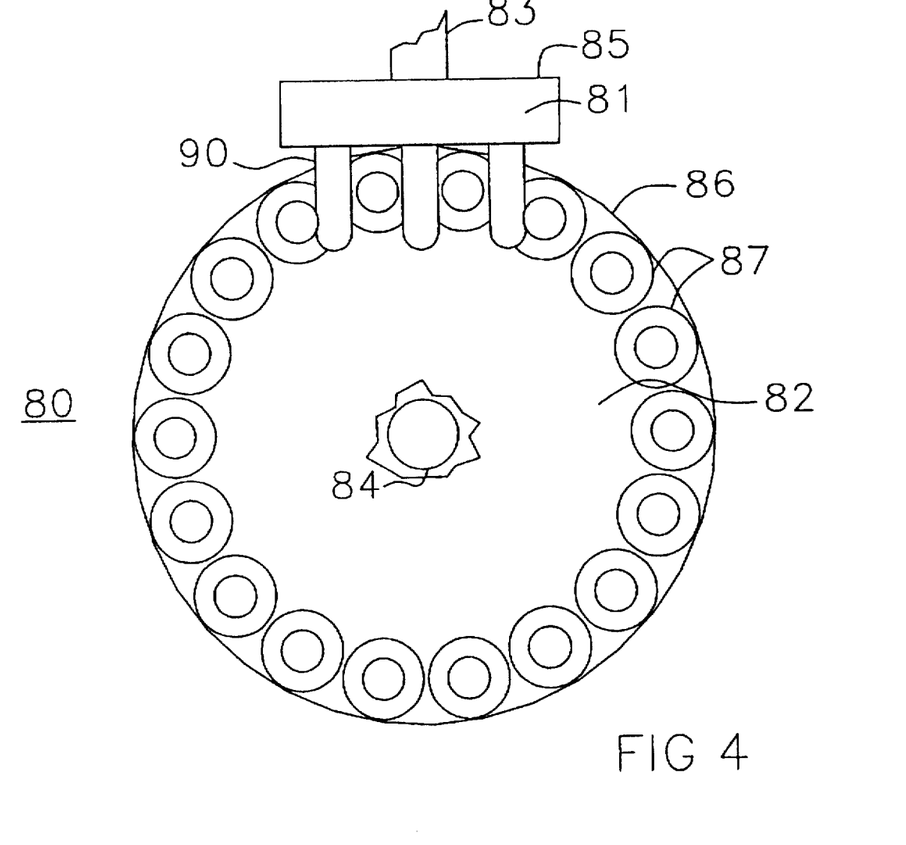
FIG. 4 is a top view of an on axis Bearing Tooth Gear set, with a 3 to 1 gear ratio.
Figure 5:
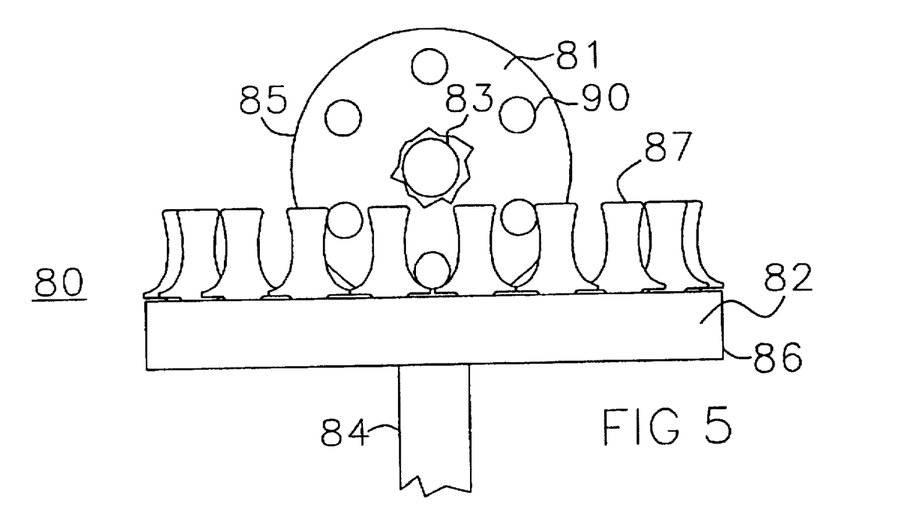
FIG. 5 is a side view of the same on axis Bearing Tooth Gear shown in FIG. 4.

FIG. 4 & 5 show an on axis Bearing Tooth Gear set 80 with a 3 to 1 gear ratio. Except for the 90 degree rotation of the axis for the individual Bearing Teeth assemblies 87, 90, the function is much the same as the spoke type Bearing Tooth Gear set 70, that being, pinion assembly 85 receives a torque from its torque transmission shaft 83, this load is then transmitted to gear assembly 86 through the rolling, meshing contact of tooth assemblies 87, 90, the gear housing 82 which is connected to torque transmission shaft 84, now conveys its imparted load to its aforementioned torque transmission shaft 84.

As with any gears using Bearing Tooth technology, the housings for both the gear 82 and the pinion 81 can be made from numerous material types, since the materials of the housings never come in contact with one another. Therefore, the toughen steel alloys required for the conventional gear tooth, to assure that the high bending, shear and contact loads can be sustained, are often employed for the rest of the gear structure (eg. housing) because often times the tooth track and housing are all one continuous part. Since the Bearing Tooth assemblies 87, 90 are separate parts from the gear housings 81, 82, the material selection for Bearing Tooth assemblies 87, 90 can be tailored to handle the high bending and contact loads. Therefore, more expensive materials can now be utilized, that would have the desired properties, yet these small assemblies 87, 90, would have little impact on the overall gear set 80 cost because of their relatively small size.

While the gear designer will want to assure that the gear housings 81, 82 will not be the "weak link", because like the conventional gear, the gear housings 81, 82 are not easily replaced, this does not mean that materials with lower tensile strengths (eg. aluminum alloys, plastics), than that of harden steel alloys, cannot be employed. Another point should be made here, that materials with high tensile strengths and low densities but poor contact load performance, such as, graphite epoxy composites, can also be used for the gear housings 81, 82. Because of the rolling action of the Bearing Tooth Gear's teeth and the increased material availability due to this rolling action, restriction on employing larger gear tooth sizes are eliminated. Unlike, the conventional gear, where tooth size drives the surface failure modes of wear, pitting and scoring, Bearing Teeth will not suffer from these same failure types (ie. sliding contact wear occurs much more rapidly than rolling contact wear). With larger tooth structures 87, 90 and their corresponding receiving structures, like the receiving pockets 25 of FIG. 3, loads can be dispersed over a larger material area and therefore the load per unit area will be less which allows the use of materials with lower tensile strengths.

Figure 6:
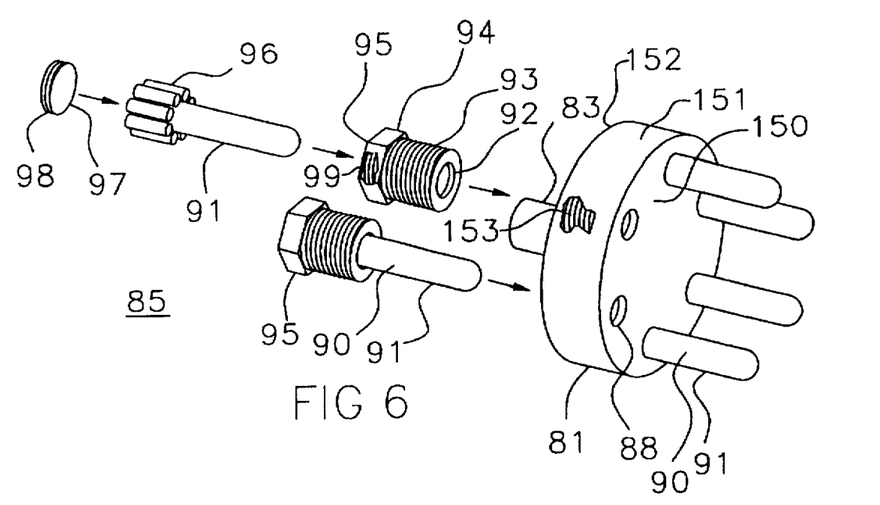
FIG. 6 is an exploded isometric view of an on axis Bearing Tooth Gear with one tooth attachment method shown.
Figure 7:
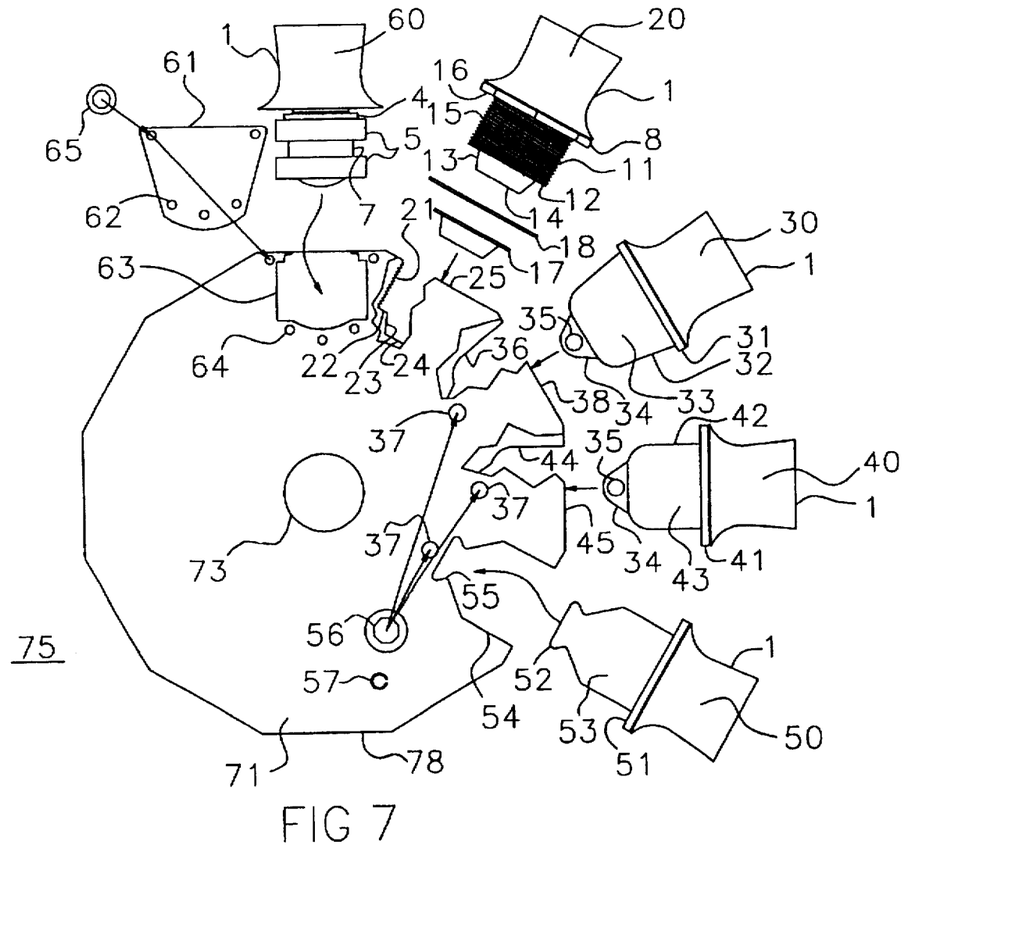
FIG. 7 is an exploded isometric view of a spoke type Bearing Tooth Gear with five attachment methods shown.

FIG. 6 & 7 show exploded views of gear assemblies 85 and 75, which demonstrate a number of attachment methods to their respective housings 81 & 71. Referring first to FIG. 6, Gear assembly 85 depicts a Bearing Tooth Gear with rear access for the installation of Bearing Tooth assembly 90, through surface 152, this assembly could just as easily been installed on the forward face 150 of housing 81 or the radial periphery 151, the designer would need to tailor the installation method to his or her own needs. Depending on the use or more specifically the design of the machine, access to one of the three surfaces 150, 151, 152 mentioned may be easier than the other two, so the designer should choose the surface with the greatest accessibility, for Bearing Tooth assembly 90 installation.

Bearing Tooth assembly 90 could be supplied as a complete unit or the possibility of supplying component parts to this assembly exist, for instance, the contact or load bearing shaft 91 would be the most likely part to fail over the life of a gear. This load bearing shaft 91 could be a harden steel alloy to improve its wear life, also the contact shaft could be of varying lengths thereby effecting its engagement duration with the teeth of the mating gear (eg. tooth assembly 87). It can be seen that the cylindrical roller bearings 96 would contact load bearing shaft 91 and in turn would contact the bearing housing 95. When the load bearing shaft 91 is installed in the bearing housing 95 it must first be passed through the hole 92 in the bearing housing 95, the load bearing shaft 91 and roller bearings 96 could then be secured in the bearing housing 95 by installing the threaded 98 retaining cap 97 to the mating treads 99 in the bearing housing. This completed Bearing Tooth assembly 90 could then have the tip or the load bearing shaft 91 passed through the hole 88 in the forward face 150 of the gear housing 81. The Bearing Tooth assembly then can be secured by mating the threads 93 in the bearing housing 95 to the treads 153 in the gear housing 81, a crescent wrench or similar tool could be mated with the bolt head 94 to the required torque specifications. The gear assembly 85 can now be use to receive or transmit rotative energy down it torque transmission shaft 83. One should note that if the bearings 96 were not housed in the gear housing 81 but instead were contained in the load bearing shaft 91, the whole Bearing Tooth assembly 90 and therefore gear assembly 85 would not be able to sustain as great a loading, as the configuration depicted in FIG. 6.

The spoke type Bearing Tooth Gear 75 depicted in FIG. 7 shows five different attachment methods for five Bearing Tooth assemblies 20, 30, 40, 50, 60. All Bearing Tooth assemblies 20, 30, 40, 50 would have bearings sets contained in their perspective housing 15, 33, 43, 53, except for Bearing Tooth assembly 60 whose bearings 5 and seal 4 would mate directly with the gear housing 71 through a tailored side access receiving recess 63. Bearing Tooth assembly 60 would be retained in the side access receiving recess 63 by the installation of retaining cover 61 by passing fasteners 65 through the retaining cover holes 62 and then into the threaded holes 64 of the gear housing 71 and then applying the proper torque to the fasteners 65. As in FIG. 6 the load bearing shaft 1 could be of varying length to control the duration of tooth engagement with their mating teeth (FIG. 1 & 2 Bearing Tooth assembly 77). Several receiving recess or pockets 25, 38, 45, 54 are shown, these pockets can be threaded 21 or tapered 36 or straight sided 44 or utilize a side slip joint 55, these receiving pockets would interface with there corresponding Bearing Tooth assembly joint type, threaded 11, tapered 32, straight sided 42 or side slip joint 52. To secure Bearing Tooth assemblies 20, 30, 40, 50 would proceed as follows. Bearing Tooth assembly 20, could provide a check of the proper depth measurement, during a check installation. If a slight adjustment was required for the depth a shim 17 could be used to separate surfaces 22, 23, 24, from surfaces 12, 13, 14 or a shim 18 could be used to separate surface 78 from surface 16. A crescent wrench could then be applied to bolt head 8, to employ the proper torque to the Bearing Tooth assembly 20. Bearing Tooth assemblies 30 & 40 have equivalent attachment methods, each one of these assemblies 30 & 40 would be slipped into their corresponding receiving pockets 36, 44 until the holes 35 in the restrain flange 34 aligned with the holes 37 in the support housing, a bolt 56 or pin 57 could then be used to secure the Bearing Tooth assemblies 30 & 40 to the gear housing 71. Bearing Tooth assembly 50 would be slipped into its receiving pocket and a bolt 56 could then be installed to prevent Bearing Tooth assembly 50 from slipping free.

Lastly, shoulders 31, 41, 51 on Bearing Tooth assemblies 30, 40, 50 could be used in conjunction with a shim 18, to obtain the proper separation from surface 78, or to remove any free play or "slop" from their respective Bearing Tooth assemblies 30, 40, 50.

Figure 8:
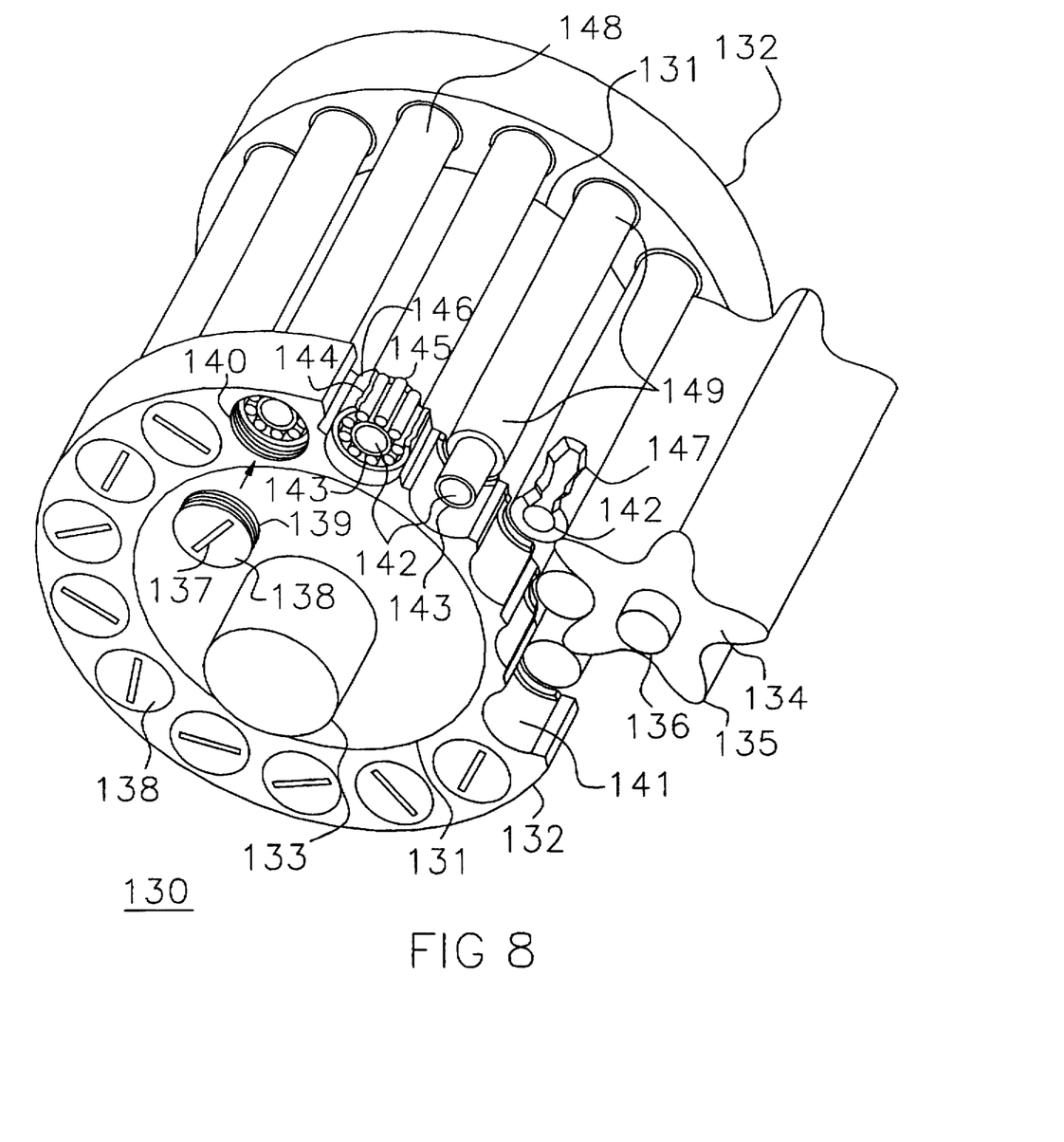
FIG. 8 is an in plane gear set with the main gear employing Bearing Teeth and the pinion employing stationary teeth.

The next sketch in the sequence is FIG. 8 and it depicts and in plane Bearing Tooth assembly 130 which employs a stationary tooth 135 pinion 134 which receives its rotative energy from its torque input shaft 136. The unique aspect of this configuration is the fact that the bearing assembly 146 is housed in the outer support housing ring 132 and not within the Bearing Tooth assemblies 148 contact zone 149, this allows for a larger diameter Bearing Tooth assembly 148 and therefore greater load carrying capability. In addition this larger envelope allows the other unique feature of employing more than one material type for the structure of the Bearing Tooth assembly 148. For instance a displacement and shock tolerant material such as an elastomeric material 147 could be bonded to high strength load carrying shaft 142, thereby giving a much quieter gear set (eg. lower decibel intensity and lower frequency or pitch), as a possible application, this quiet gear set could prove useful in the reduction of the noise signature of a nuclear sub.

The load carrying shaft 142 could then interface with the inner bearing race or ring 143, which in turn would contact the rolling elements 145, which contacts the outer race 144 and finally the bearing assembly 146 would be set or mounted in the receiving pockets 141. To retain the Bearing Tooth assembly 148 a threaded 139 retaining cap 138 could be set into the threaded 140 receiving pocket 141 and torqued into place by the use of the slot 137 and a screwdriver. In the last paragraph the option of employing an elastomeric material 147 in the construction of the Bearing Tooth assembly 148 was mentioned but the use of a sound deadening, shock absorbent material can be employed elsewhere on the Bearing Tooth Gear assembly 130, namely, the outer support housing ring 132 could also be constructed of elastomers or plastics, to name a few material choices. This outer support housing ring 132 could then be bonded or mechanically attached to the inner support housing 131, which in turn would be connected to torque transmission shaft 133. The advantages of employing shock absorbent material and structures 132, 147 can again be better understood with an example. Assume gear set 130 is part of a wench used on a construction crane, if that crane were to lift near it maximum rated load and that load were to shift and for a fraction of a second and the cable was not receiving the full load (eg. an I-beam slips down ⅓ of its length before again be restrained), a large shock load could be transmitted through the cable to the gear set but the Bearing Tooth Gear set 130 would have a greatly improve shock tolerance, over that of a conventional gear set, if it were to employ elastomeric structures 132, 147. With a conventional gear set structural failure of the pinion and gear teeth would likely result and if there were no other restrain mechanisms (eg. a winch brake), look out below.

Figures 9A, 9B, 9C:
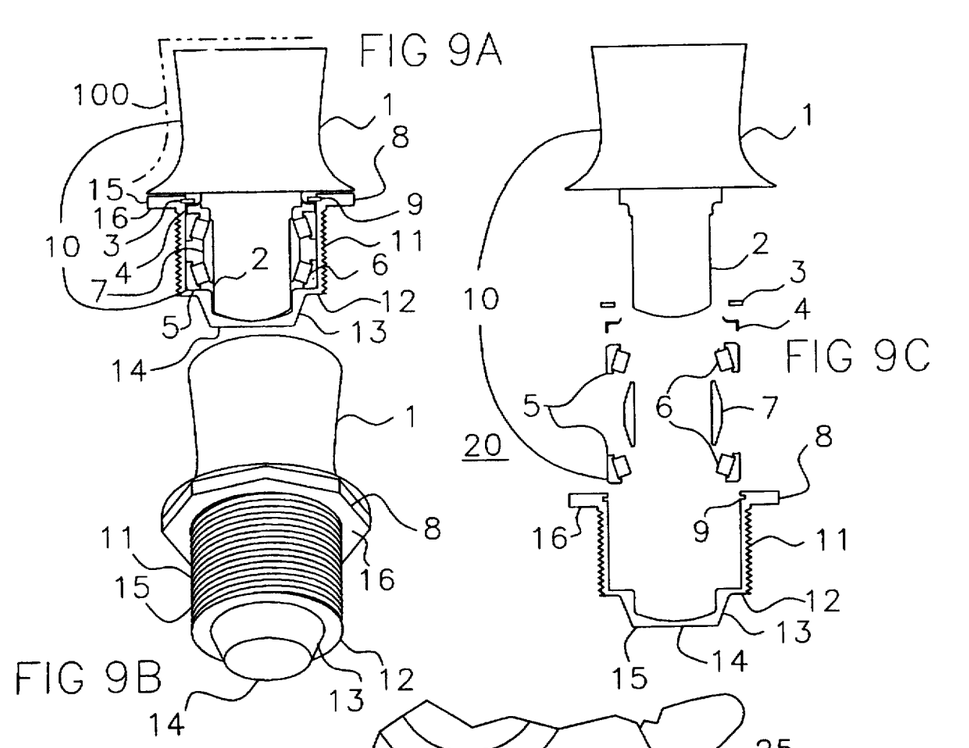
FIGS. 9A, 9B, and 9C shows 3 views of a quick release Bearing Tooth assembly.

Proceeding to FIGS. 9A, 9B and 9C, which shows three views of Bearing Tooth assembly 20 a cross-sectional, isometric and exploded cross-sectional. The following parts show a possible configuration for a Bearing Tooth assembly 20. Bearing Tooth contact structure 1 would be of such a geometry that it would mesh without binding but remain in contact with its mating gear tooth 77 through the entire tooth engagement. Bearing Tooth contact structure 1 could be of greater axial length if longer tooth engagement with mating gear teeth 77 is desired. Support bearing shaft 2 could be an uninterrupted part of, contact structure 1 but the support bearing shaft 2 and contact structure 1 could be made of different materials (eg. elastomers for contact structure 1 and hardened steel for support bearing shaft 2) to obtain different performance characteristics. Inner bearing race 7 would be bonded or mechanically attached to support bearing shaft 2, snap ring 3, seal 4 and top rolling elements 6 and top outer race 5 would need to be installed before the attachment of the inner bearing race 7. The bottom rolling elements 5 and bottom outer race can now be put in place, this collection of parts forms assembly 10, the bearing housing 15 can be slid over assembly 10 and then be secured by snapping snap ring 3 into the snap ring groove 9. The bearing housing 15 would be designed to receive assembly 10 with a close tolerance fit, its exterior circumference would be threaded 11 and be of the right diameter and thread type 11 to interface with its corresponding gear housing's 71 receiving pocket 25. Surfaces 12, 13, 14 and 16 would interface with shims 17 or 18 to maintain the proper separation between Bearing Tooth assembly 20 and the gear housing 71.

Figure 10:
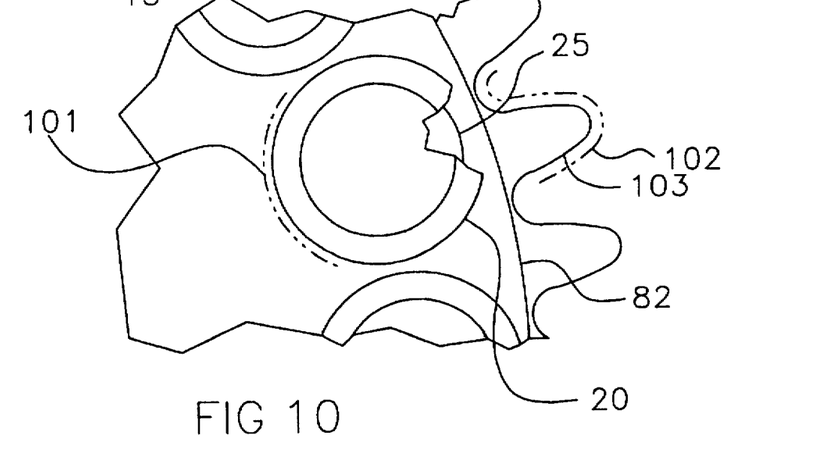
FIG. 10 compares the tolerance envelopes of a Bearing Tooth and a conventional gear tooth.
Figures 11, 12, 13:
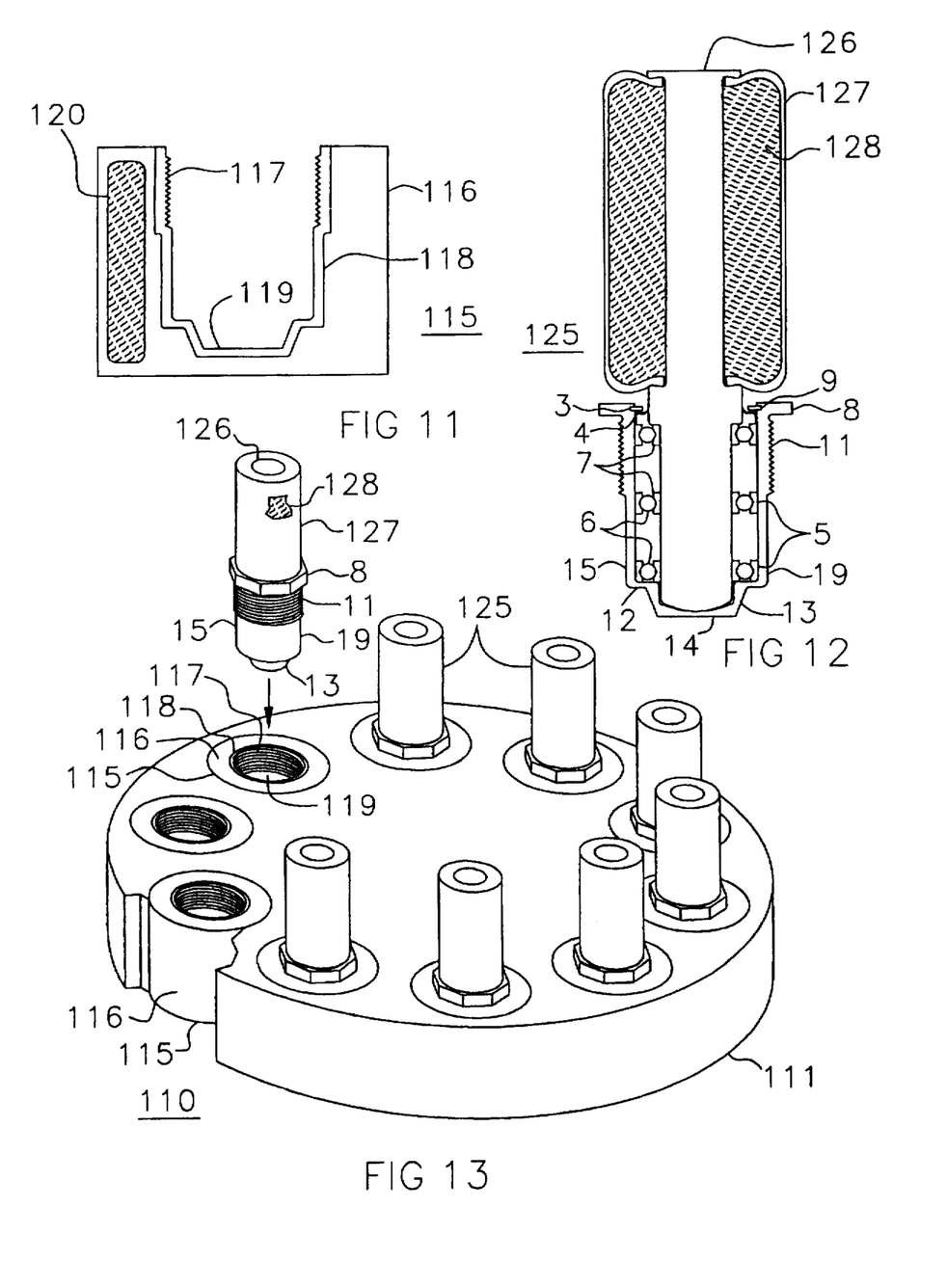
FIG. 11 shows an elastomeric, fluid filled or gas filled, receiving pocket.
FIG. 12 shows a fluid filled or gas filled Bearing Tooth.
FIG. 13 is an exploded isometric view of an on axis Bearing Tooth Gear, employing the Bearing Teeth of FIG. 12 and the receiving pockets of FIG. 11.

Building a close tolerance and relatively inexpensive part can be shown by referring to FIGS. 9A, 9B, 9C, & 10. In FIGS. 9A, 9B and 9C Bearing Tooth contact structure 1, support bearing shaft 2 and bearing housing 15 are relatively simple "turned" parts where very high tolerances can be obtained. Tolerance envelope 100 would be very small or "tight", for the Bearing Tooth contact structure 1, where tolerances of 10 thousandths of an inch, can easily be obtained with such a part. FIG. 10 shows the placement of a Bearing Tooth assembly 20 in it corresponding receiving pocket 25. Accurate hole or receiving pocket 25 placement, is a much easier task to accomplish, than the milling or machining of a complex conventional gear tooth geometry 103 into the outer radius of a gear housing 82. Therefore, tolerance envelope 101 for the Bearing Tooth assembly 20 will be much tighter and easier to control than the conventional gear tooth tolerance envelope 102. With the comparatively less complex parts 1, 2, 15, 25 and the more simplistic manufacturing methods of the Bearing Tooth Gear assembly, tolerancing should be an easier parameter to control, so more accurate gears can be made at lower manufacturing costs. In addition, the rolling action of the Bearing Tooth assembly 20, allows the option of employ displacement and shock tolerant materials 147 (eg. elastomers) or structures 115, 125 (ie. FIG. 11, FIG. 12), which in turn relaxes tolerance requirements. As an example it is quite evident that a pneumatically filled Bearing Tooth 125 can withstand placement and the corresponding engagement inaccuracies better that a ridge, metallic conventional gear tooth 103, whose material strength requirements have created a hard and brittle structure, which has little tolerance to the cyclical shock loading, that would be created by inaccurate tooth geometry, placement or orientation.

Lastly, FIGS. 11, 12 & 13 demonstrate a Bearing Tooth technology which employs addition methods, for withstanding displacement inaccuracies and high shock loads. FIG. 11 shows a receiving pocket assembly 115, which would be made from displacement and shock tolerant materials 116 (eg. elastomers) and could also employ pneumatically or hydraulically filled cavities 120 which could offer varying shock attenuation and sound abatement performance. The receiving pocket assembly 115 would have a internal ridge receiving pocket 118 which would bond or be mechanically attached to the displacement and shock tolerant material 116 and have a restrain mechanism, such as, being threaded 117 and having internal surface 119 to counter and moment loading.

In FIG. 12 the pneumatically or hydraulically filled Bearing Tooth assembly 125 would have the pneumatic or hydraulic fill 128, filling retaining envelope 127 and this retaining envelope 127 would be mounted on a support shaft 126. The support shaft 126 would then interface with the inner bearing race 7, which would interface with rolling element 6 which would interface with outer race 5. The bearing components 5, 6, 7 and the lower portion of support shaft 126 would be housed in the bearing housing 15 as would the seal 4, these components would then be restrained by a snap ring 3, which would be snapped into the snap ring groove 9. The threaded structure 11 of bearing housing 15 would be design to mate with the threads 117 of internal ridge receiving pocket 118, in addition surfaces 12, 13, 14, 19 of bearing housing 15 would closely interface with surface 119 of the receiving pocket. The octagonal bolt head 8 would be used to secure the pneumatically or hydraulically filled Bearing Tooth assembly 125.

FIG. 13 shows an isometric of gear assembly 110 which employs pneumatically or hydraulically filled Bearing Tooth assemblies 125 and receiving pocket assemblies 115. The gear housing 111 is bonded or mechanically attached to the displacement and shock tolerant material 116 which is bonded or mechanically attached to internal ridge receiving pocket 118. The pneumatically or hydraulically filled Bearing Tooth assembly 125 would be secured by mating its treads 11 to the threads 117 of the internal ridge receiving pocket 118, the surfaces 13, 19 on the bearing housing 15 would contact the internal surface 119 of the internal ridge receiving pocket 118, the Bearing Tooth assembly 125 would then be tighten to the proper torque specifications, by mating a crescent wrench or like tool to octagonal bolt head 8 on bearing housing 15. Once all of the pneumatically or hydraulically filled Bearing Tooth assemblies 125 are installed, loads could then be applied to the retaining envelope 127, with its pneumatic or hydraulic fill 128 and then to the support shaft 126.

The foregoing description of the preferred embodiments of the invention was given for illustrative purposes. These embodiments were not intended to be exhaustive or to limit the invention to the precise forms disclosed. Many modifications, variations and combinations of the above disclosures are possible. It is intended that the scope of the invention not be limited by the detailed description, but rather by the following claims.

What is claimed is:

1. An apparatus comprising: a rotatable, gear tooth assembly, having a contact structure, a support beating shaft, and a bearing system to reduce rotational friction, said beating system being located outside of an envelope of said contact structure, said gear tooth assembly further having displacement and shock tolerant materials in makeup of said contact structure, said gear tooth assembly further comprising pneumatically filled receiving pockets assemblies.

2. The gear tooth assembly of claim 1 further comprising a seal to isolate said bearing system from exterior environments and to contain any lubricants employed.

3. The gear tooth assembly of claim 1 further comprising a bearing housing to encompass said bearing system and to perform an attachment interface between said bearing system and said gear housing.

4. The gear tooth assembly of claim 1 further comprising metallic materials in makeup of said contact structure.

5. The gear tooth assembly of claim 1 further comprising metallic materials in makeup of said support bearing shaft.

6. The gear tooth assembly of claim 1 further comprising low density structural materials in makeup of said support bearing shaft.

7. An apparatus comprising: a rotatable, gear tooth assembly, having a contact structure, a support bearing shaft, and a bearing system to reduce rotational friction, said bearing system being located outside of an envelope of said contact structure, said gear tooth assembly further having displacement and shock tolerant materials in makeup of said contact structure, further comprising a pneumatically filled contact structure.

8. An apparatus comprising: a rotatable, gear tooth assembly, having a contact structure, a support bearing shaft, and a bearing system to reduce rotational friction, said bearing system being located outside of an envelope of said contact structure, said gear tooth assembly further having displacement and shock tolerant materials in makeup of said contact structure, further comprising a hydraulically filled contact structure.

9. A gear housing comprising outer support housing ring, inner support housing and receiving pockets to receive rotatable gear tooth assemblies, said gear housing further having displacement and shock tolerant materials in makeup of said inner support housing, wherein said receiving pockets comprise hydraulically filled receiving pockets assemblies.

10. The gear housing of claim 9 further comprising low density structural materials in makeup of said outer support housing ring.

11. The gear housing of claim 9 further comprising metallic materials in makeup of said outer support housing ring.

12. The gear housing of claim 9 further comprising low density structural materials in makeup of said inner support housing.

13. The gear housing of claim 9 further comprising metallic materials in makeup of said inner support housing.

14. A gear support housing comprising a support housing and receiving pockets assemblies to receive rotatable gear tooth assemblies, said gear housing further having displacement and shock tolerant materials in makeup of said receiving pockets assemblies, wherein said receiving pockets comprise hydraulically filled receiving pockets assemblies.

15. A gear support housing comprising a support housing and receiving pockets assemblies to receive rotatable gear tooth assemblies, said gear housing further comprising pneumatically filled receiving pockets assemblies.

16. A gear support housing comprising a support housing and receiving pockets assemblies to receive rotatable gear tooth assemblies, said gear housing further comprising hydraulically filled receiving pockets assemblies.

\* \* \* \* \*